Figure 1:
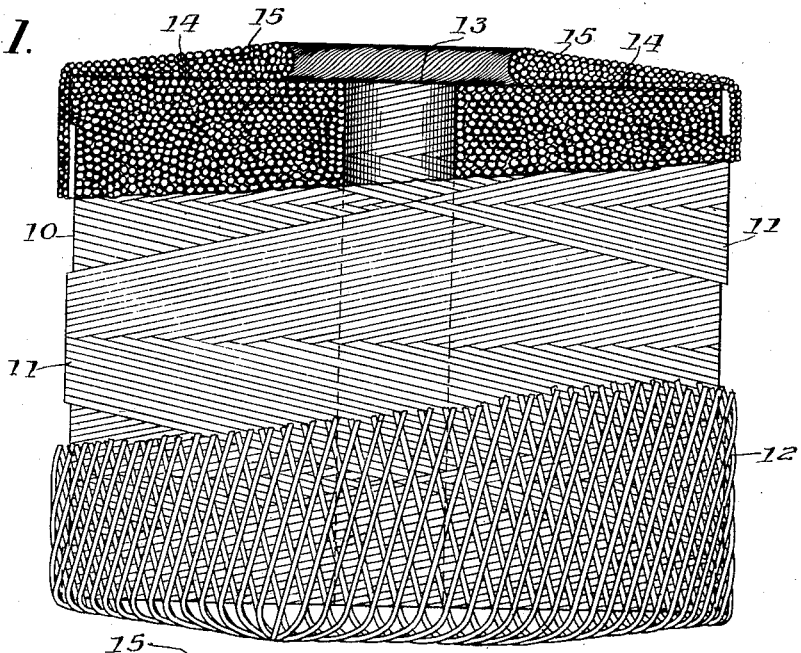

G. L. RICE.
TWINE BALL.
APPLICATION FILED JAN. 31, 1918.

1,340,837. Patented May 18, 1920.

Inventor
George L. Rice.
by Chas. E. Lord
Atty.

UNITED STATES PATENT OFFICE.

GEORGE L. RICE, OF CHICAGO, ILLINOIS, ASSIGNOR, BY MESNE ASSIGNMENTS, TO INTERNATIONAL HARVESTER COMPANY, A CORPORATION OF NEW JERSEY.

TWINE-BALL.

1,340,837.   Specification of Letters Patent.   Patented May 18, 1920.

Application filed January 31, 1918. Serial No. 214,754.

*To all whom it may concern:*

Be it known that I, GEORGE L. RICE, a citizen of the United States, residing at Chicago, in the county of Cook and State of Illinois, have invented certain new and useful Improvements in Twine-Balls, of which the following is a full, clear, and exact specification.

This invention relates to twine balls and more particularly to balls of twine used in harvesting machinery, as for instance, grain binders.

One object of the invention is to provide a ball of twine containing the maximum amount of twine in a given space, and a ball of such formation that it will resist lateral strains which tend to cause it to collapse.

A further object is to provide a ball of such a nature that all of the twine comprising the ball, may be unwound therefrom without snarling.

In harvesting machines, such as grain binders, the twine ball is placed in a receptacle and the twine is unwound from the center thereof as the grain is bound, and it has been found that balls having the usual type of winding, as, for instance, the universal winding, will tend to collapse, and the twine in these balls will tend to snarl when the outer layers of the ball are reached, and to overcome this difficulty applicant has added to the usual winding a supplemental winding in the nature of a cover which holds these outer layers of the main winding intact as they are being unwound, and which has the added function of preventing the endwise expansion of the ball and also the collapse of the ball when the ball is subjected to lateral pressure, as, for instance, during piling and shipping.

I have illustrated one embodiment of my invention in the drawings, and in these drawings—

Figure 2:
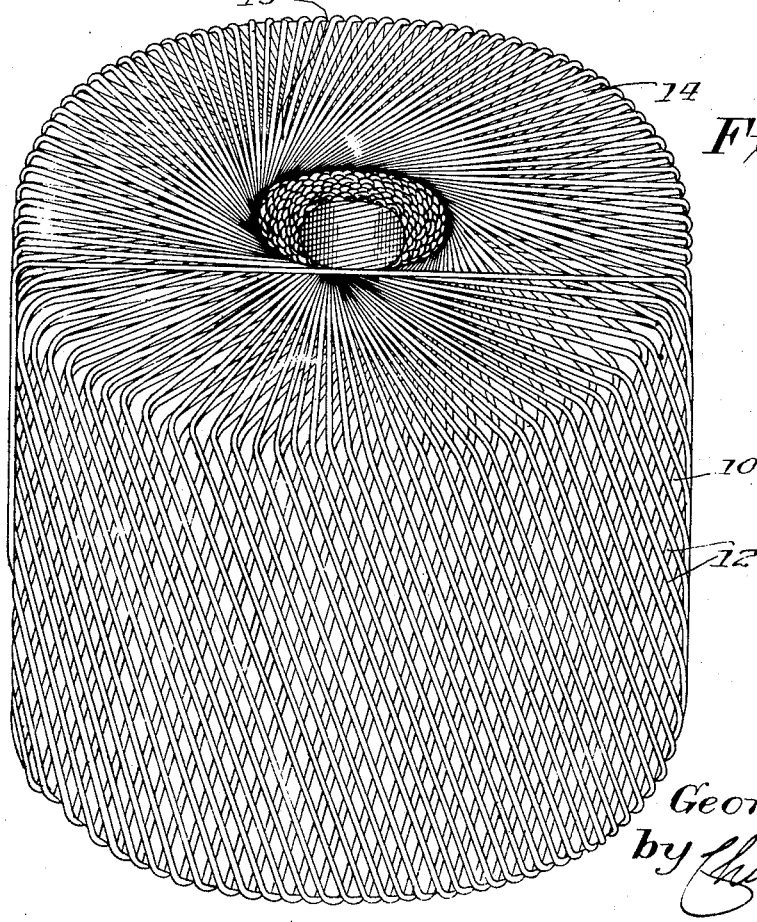

Figure 1 shows a side elevation of the ball, part of this figure showing the outer cover winding broken away, and still another part showing a cover and the inner or main winding in section; and Fig. 2 shows in perspective the ball with the cover thereon.

The inner or main winding is the well known type of universal winding, such as illustrated in Patent No. 480,158 to S. W. Wardwell, Jr., dated August 2, 1892, and this winding will not be described in detail. This inner winding is close or compact and contains the maximum amount of twine for the amount of space occupied, and for this reason this form or some similar form of winding is used for the main winding.

As is well known, the main winding is formed by means of spiral turns of twine which run back and forth with respect to the length of the ball. Upon the completion of this part of the ball 10, there are left of necessity, projecting portions 11 comprising the outer turns of the twine, and these are the portions that give the most trouble from snarling and collapsing. To support these outer turns and to also prevent the longitudinal bulging of the ball due to lateral pressure, there is provided an outer layer 12 which is tightly wound around the cylindrical body of the inner ball 10 and is preferably of the open formation illustrated in the drawings. The end walls of the main winding 10 are flat as shown at 13, and the ends of the outer winding 12 fit closely against these flat ends as shown at 14, but leave an uncovered area surrounding the axial opening through the ball. The outer surfaces of the cover winding 12 are inclined as shown at 15, and have a truss action whereby the ends of the outer cover exert an inward pressure on the outer flat ends of the main portion 10 of the ball. By experimenting it has been found that this inward pressure exerted by the trussed ends of the outer cover, has a material effect in resisting the tendency of the inner ball to bulge when the ball is subjected to lateral pressure.

By means of making the ends of the inner ball 10 flat, there is also obtained a winding having the maximum amount of twine for the space occupied.

It should, of course, be understood that the winding in the cover 12 forms a continuation of the winding of the inner ball 10 and that the entire length of twine contained in the inner and outer windings is utilized.

From the above description it will be seen that I have provided a twine ball which will fulfil all the exacting requirements of balls used in harvesting machines, but it should be understood that the use of balls of this type is not in any way limited to machines of this character, although the requirements of such machines are more exacting than those of the general trade.

While I have in the above specification described one embodiment of my invention, it should be understood that the same is capable of modification and that modifications may be made without departing from the spirit and scope of the invention as expressed in the following claims.

1. As an article of manufacture, a ball of twine consisting of a cylindrical body with flat ends and an axial opening and an open mesh cover-winding formed to leave an uncovered area at each end of the body around said opening.

2. As an article of manufacture, a ball of twine consisting of a cylindrical body formed with flat ends and an axial opening of substantially uniform diameter and an open mesh cover-winding thereon formed to leave an uncovered area at each end of the body around said opening, the turns of said cover-winding being thickly banked around the margins of said areas and becoming gradually thinner toward the edges of the body.

In testimony whereof I affix my signature.

GEORGE L. RICE.